United States Patent [19]

Moline

[11] 3,888,359
[45] June 10, 1975

[54] MATERIAL HANDLING APPARATUS
[75] Inventor: Wilbur L. Moline, Joliet, Ill.
[73] Assignee: Kemlite Corporation, Joliet, Ill.
[22] Filed: Oct. 1, 1971
[21] Appl. No.: 185,526

[52] U.S. Cl. ............ 214/1 BB; 214/1 BT; 214/6 R; 271/84; 271/194; 271/267
[51] Int. Cl. ........................ B65h 5/10; B65h 29/24
[58] Field of Search ............ 271/54, 84, 74 MS, 55, 271/85, 194, 267, 268; 214/1 BB, 1 BT, 16.6, 6 R; 294/61; 198/178, 180; 221/213–216

[56] References Cited
UNITED STATES PATENTS

| | | | |
|---|---|---|---|
| 2,413,554 | 12/1946 | Evers | 271/74 X |
| 2,959,412 | 11/1960 | Sjostrom | 271/84 |
| 3,102,632 | 9/1963 | Moser et al. | 198/178 |
| 3,584,868 | 6/1971 | Fromm et al. | 271/84 |
| 3,601,272 | 8/1971 | Black | 214/1 BB X |
| 3,655,316 | 4/1972 | Husges | 214/1 BT X |

*Primary Examiner*—Evon C. Blunk
*Assistant Examiner*—Bruce H. Stoner, Jr.
*Attorney, Agent, or Firm*—Carl C. Batz

[57] ABSTRACT

Apparatus for feeding into a press while the press is open a raw material sheet while at the same time picking up and withdrawing from the press a moulded sheet or panel which has previously been moulded by the press. The apparatus employs a long cylinder the piston of which is connected by a cable to a carriage to move the carriage in and out of the press. The carriage is equipped with a device for grasping the edge portion of a fresh sheet and pull it into the press. The carriage is also equipped with mechanism for picking up and moving the molded sheet from the press as the carriage is retracted.

27 Claims, 10 Drawing Figures

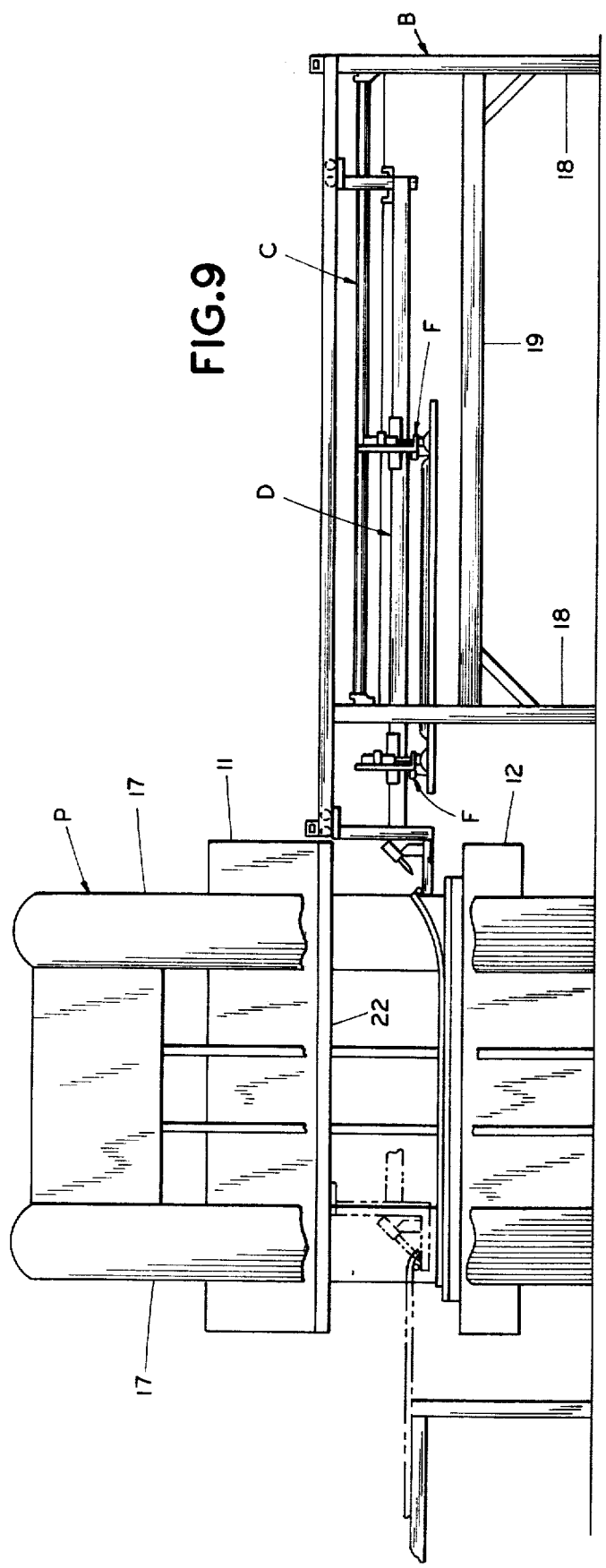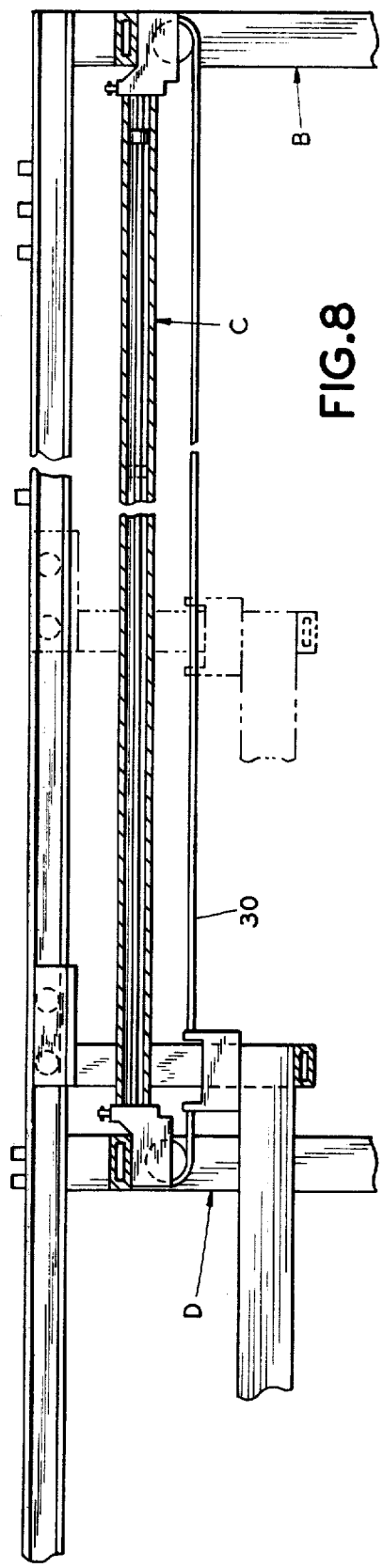

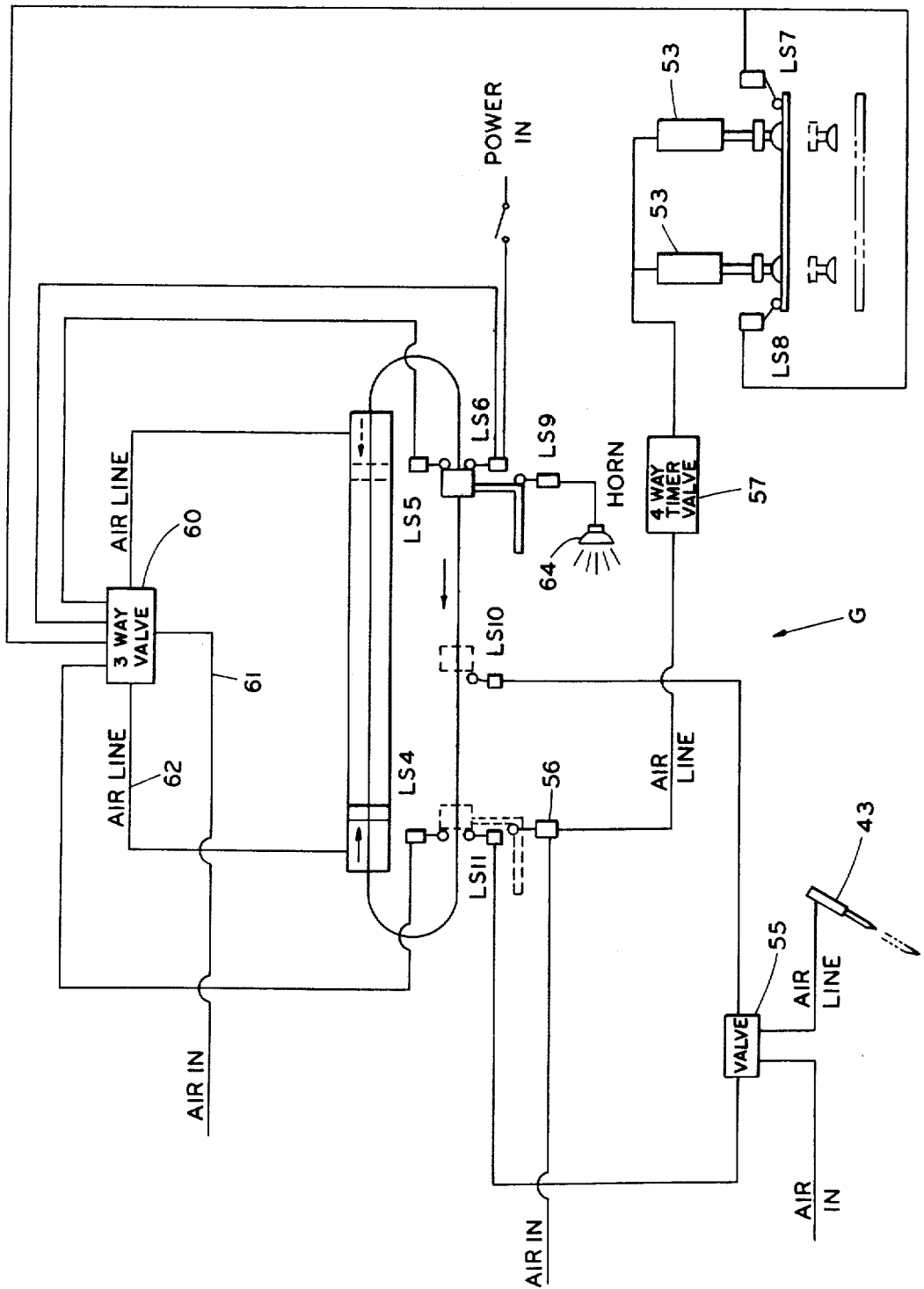

MATERIAL HANDLING APPARATUS

This invention relates to material handling apparatus for operation in connection with presses and deals with apparatus for feeding material into a press or removing the formed material from a press or for accomplishing both these functions in a single stroke.

The invention is particularly applicable to the feeding of sheets of resin-impregnated fiberglass sheets into a press and the removal of the panels from the press after the press has operated to form the panels and to heat the resin to cause it to set.

Traditionally the feeding of the press and the removal of the formed panels has been done by hand when the press opens, but some effective way to accomplish these functions by machinery alone would be very desirable. For one thing, the heat necessary to set the resin makes it almost unbearable for men to work near the heating elements of the press. Further there is a need to transfer the materials rapidly and accurately to their proper position within the press and to remove the products quickly and without fail. It is desired to remove the formed panel from its position within the press to storage outside the press and at the same time pull a new resin-impregnated panel from a support outside the press completely to its proper position within the press, all during the relatively short period the press remains open. It is desired that the time the press remains open be as short as possible.

I have found that it is possible to achieve the foregoing objectives by automatic operation of apparatus and mechanisms one embodiment of which will be described herein in detail.

This embodiment is illustrated by the accompanying drawings in which

FIG. 8 is an enlarged detail view showing the drive cylinder in section and showing its relation to the accompanying mechanism;

FIG. 9 is a view similar to FIG. 6 but showing the carriage retracted to the point where it is about to drop the sheet which has been pulled into the press; and FIG. 10 is a schematic fluid flow diagram.

Figure 1:
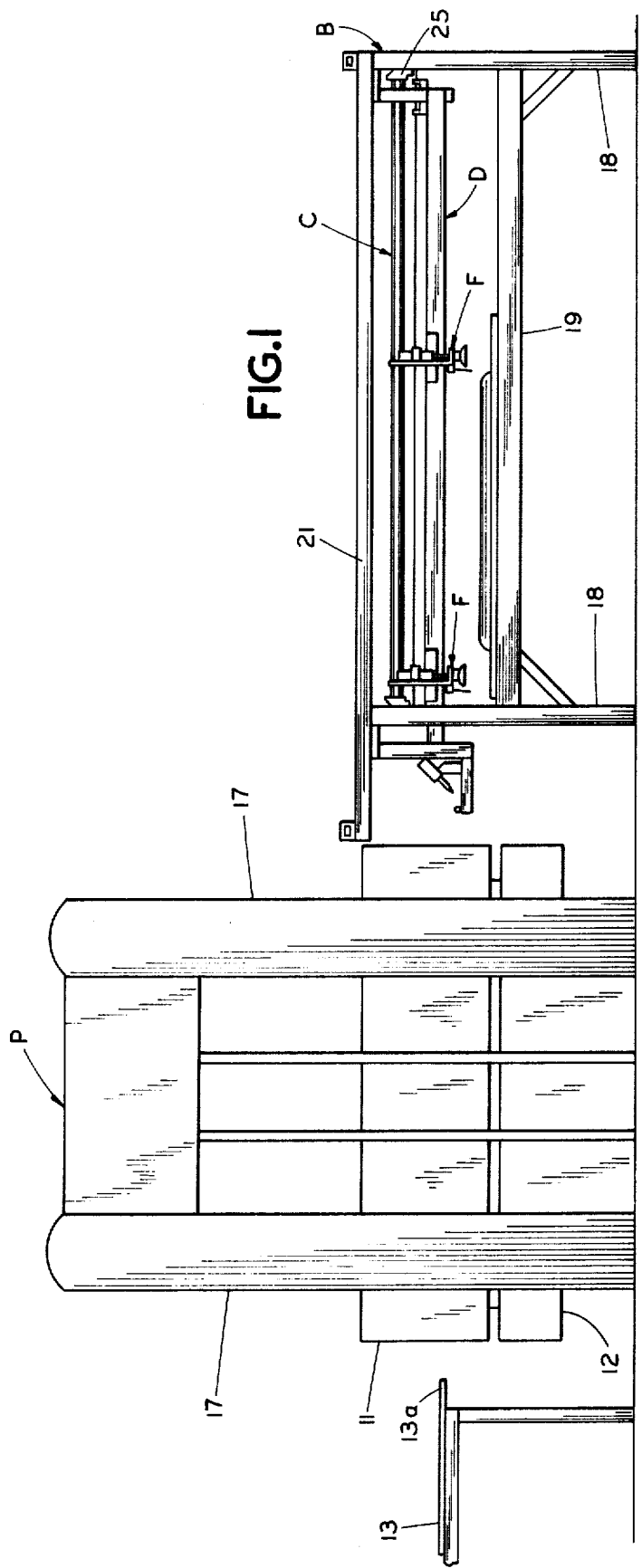
FIG. 1 is a side elevational view of the press and the apparatus for feeding materials to the press and removing products from the press, this view showing the carriage in its retracted position.

As illustrated in the drawings the press P has upper and lower jaws respectively indicated by the characters 10 and 11 (See FIG. 1)

At the left is a table on which a resin-impregnated fiber glass sheet 13 is supported with its edge 13a extending over the edge of the table.

At the right stands a frame B which carries a cylinder C which operates the carriage D in reciprocal motion. The carriage carries mechanism E for grasping the edge portion 13a for pulling the raw sheet into the press, and carries also mechanism F for picking up and carrying the molded sheets out of the press. Switching and control apparatus G operates to control automatically the movements of the cylinder, the carriage and the mechanisms E and F for putting in and taking out product from the press.

The general sequence of operation is as follows: The cylinder C operates to cause carriage D to move forwardly into the press. As the carriage reaches the end of its stroke mechanisms E and F go into operation to simultaneously grasp the raw sheet edge 13a and pick up the molded sheet already in the press. Then reverse operation of cylinder C moves carriage D rearwardly, pulling the sheet 13 into position in the press at the same time it removes the finished molded panel from the press. Automatic apparatus G controls the dropping of the sheet at its proper station and the starting and stopping movements of the carriage. All of this sequence is accomplished between the time the press opens and the time it begins to close.

The press P is of the type commonly used in molding resin sheets. It has the upper jaw 11 and the lower jaw 12. Cylinders 17 provide the power for raising upper jaw 11 to open the press and to press jaw 11 downwardly to mold the material between the jaws. The jaws are heated to cure the resin while it is in the press. 9).

Figure 3:
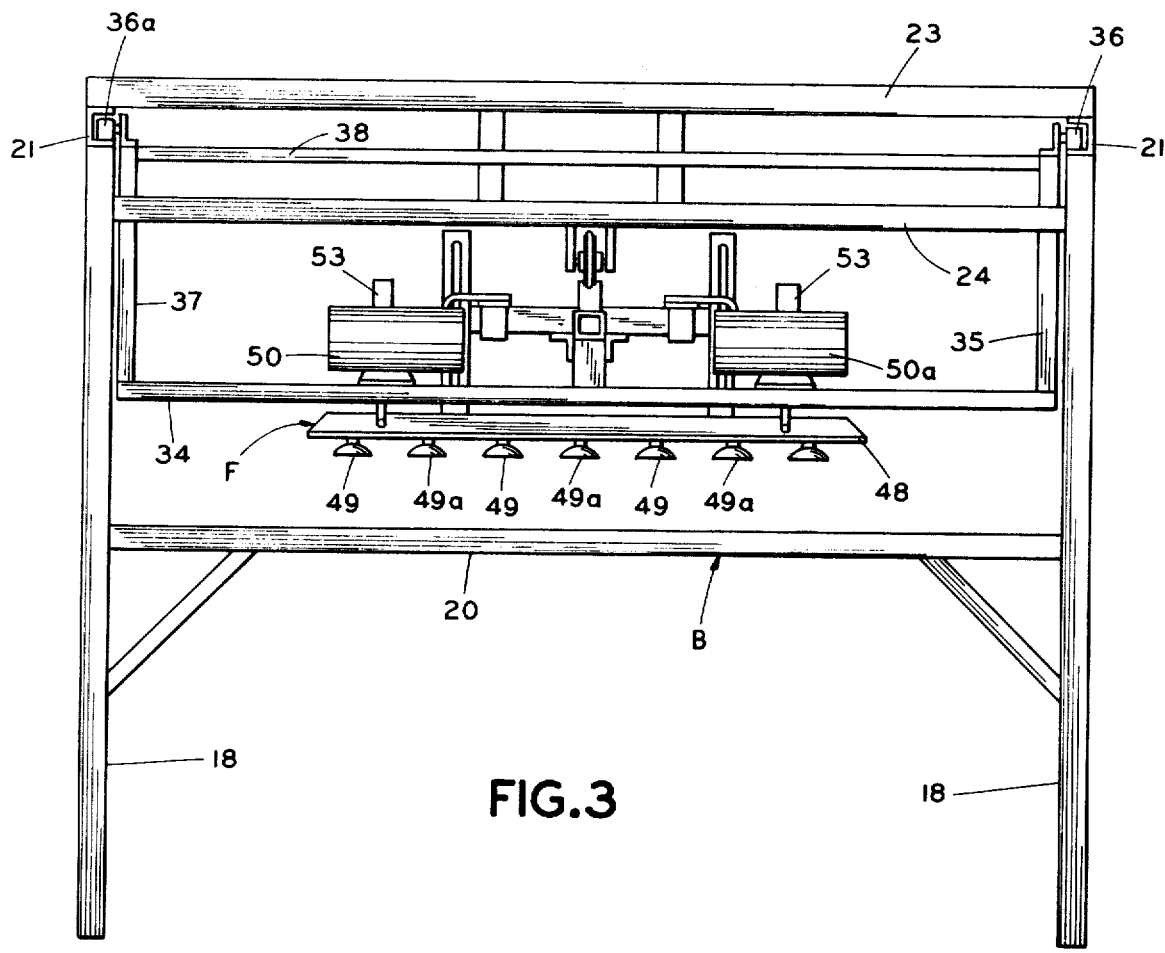
FIG. 3 is a rear end elevational view of the apparatus.
Figure 6:
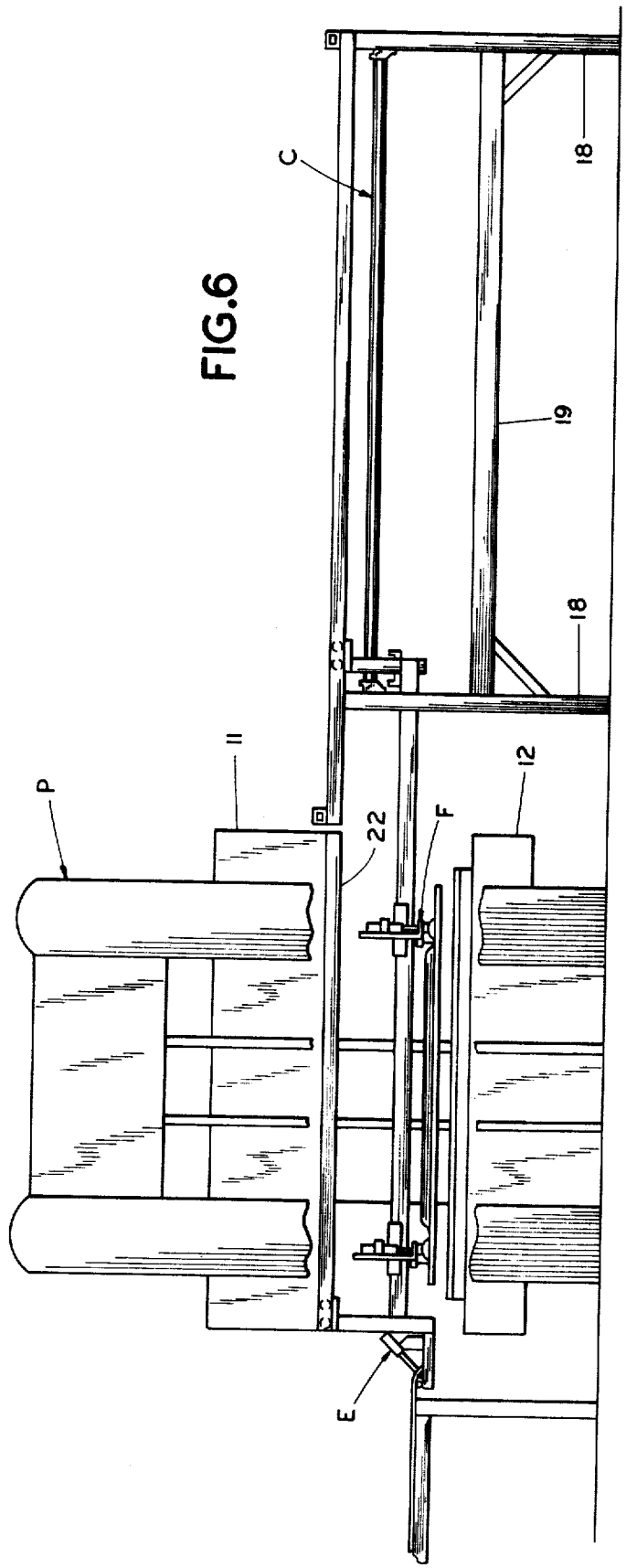
FIG. 6 is a view like FIG. 1, but showing the carriage extended into the press and parts of the press broken away to show the carriage as it extends within the press.

The frame B (See FIGS. 1 and 3) includes four legs 18, side frame members 19, and end frame members 20. Secured at the top of legs 18 are the channel guide members 21, one of members 21 being on the left and the other on the right (as seen in FIG. 3). Extensions of these guide members 22 are mounted in the press and are lined up with the members 21. (See FIGS. 6 and 9.). Cross structural frame members 23 and 24 provide the necessary cross support at the top part of the frame (See FIG. 3).

The cylinder C is secured at its rearward end to the cross member 24 by the bracket 25 which is equipped with a pulley 26. At its forward end cylinder C is secured to the front cross member 24a by the bracket 27 which is equipped with the pulley 28. Inside cylinder C is a piston 29 adapted to move forwardly or rearwardly of the cylinder as fluid is fed to one side or the other of the piston. A cable 30 is secured to the piston and extends from the piston rearwardly to the end of the cylinder and then about pulley 26, then forwardly over the pulley 28, into the forward end of the cylinder and is secured to the other side of the piston. The cylinder is equipped with connections for introducing fluid under pressure into each end of the cylinder. The rearward end of the cylinder has a bleeder port 31 whereby fluid can be bled from this end of the cylinder at a selected rate, and the forward end of the cylinder has a bleeder port 32 whereby fluid can be bled from this end of the cylinder at a selected rate.

The carriage D has a frame structure formed by the lower side members 33 and the lower end members 34. At its rearward end the carriage has at its right hand side the vertical bracket 35 which is equipped with rollers 36 disposed in the guide member 21, and a similar bracket 37 is equipped with rollers 36a which are disposed within the left hand guide member 21. Similar carriage bracket members at the forward end of the carriage have similar rollers disposed within right and left hand guide members.

Cross members 38 extend from the side member 33 on one side to the side member 33 on the other side. A structure 40 is mounted on cross member 34 and the cable 30 is attached to structure 40, so that as the piston of cylinder C moves in one direction the cable pulls the carriage in the opposite direction, and when the piston reverses direction the cable pulls the carriage in a reverse direction.

Figure 4:
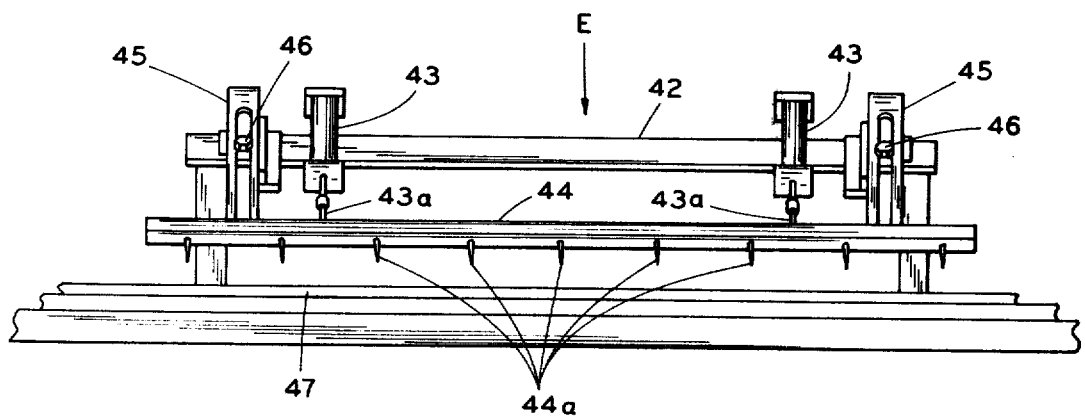
FIG. 4 is a detail front end view of the mechanism for grasping the sheet materials to be fed into the press.
Figure 7:
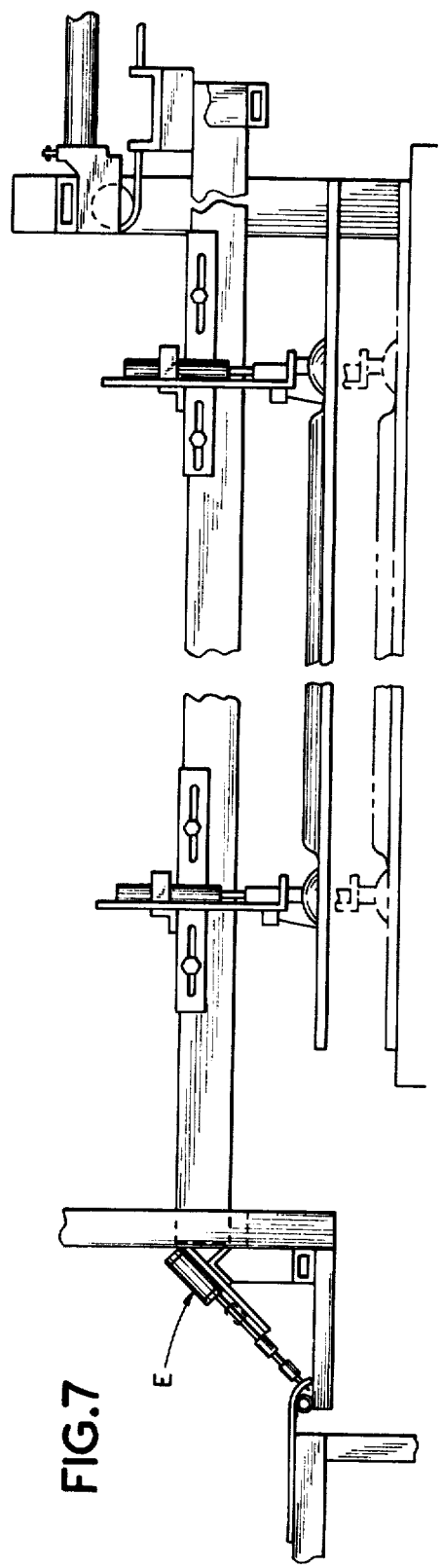
FIG. 7 is an enlarged view of the portion of the carriage which extends into the press.

The mechanism E, for grasping an edge of the sheets being fed to the press (See FIGS. 4 and 7) includes a lip 41, attached to the carriage brackets 37, which extends under the edge of the raw material sheet when the carriage is extended forwardly to its limit. Also carried by carriage brackets 35 and 37 is a cross bar 42 on which are mounted the cylinders 43 having pistons 43a which connect with needle bar 44 having needles 44a extending toward the lip 41. The slotted brackets 45 are attached to bar 44 and engage the bolts 46 on bar 42.

On the tip of lip 41 is a tube or strip 47 made of flexible material, and as the pistons of cylinders 43 move outwardly the needles 44a pass through the edge portion 13a of the raw material sheet 13 and are anchored below the strip 47.

Figure 5:
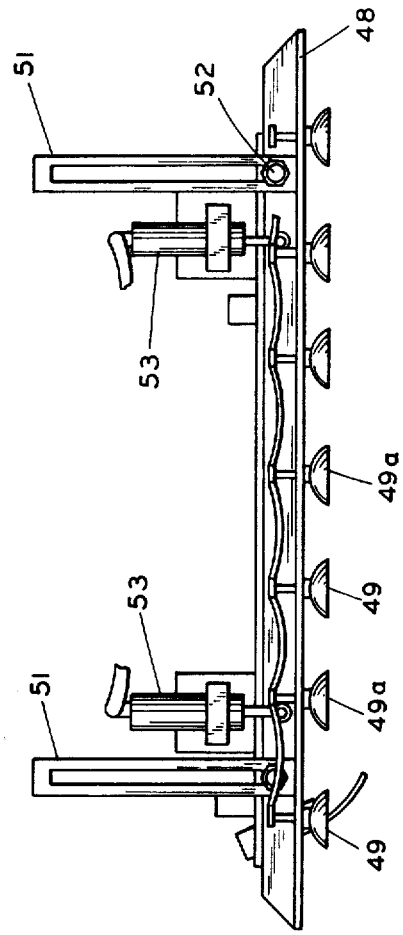
FIG. 5 is a detail view of the mechanism for engaging and supporting the finished panels which are to be removed from the press.
Figure 2:
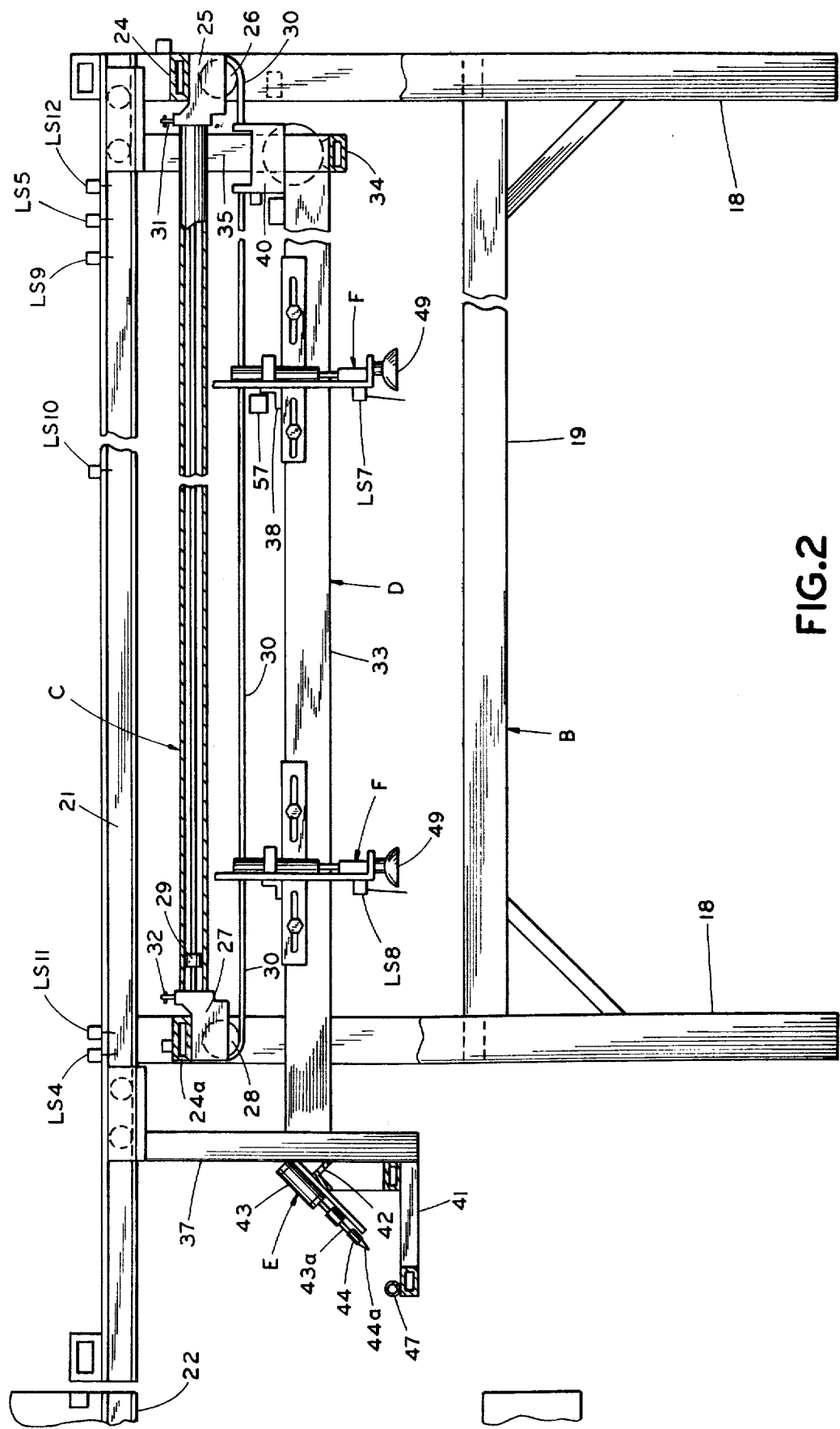
FIG. 2 is a side elevational view of the feeding and product removing mechanisms with parts of the main cylinder being shown in section.

The mechanism F for picking up and carrying the molded sheet from the press (See FIGS. 2,3 and 5) includes a distributor board 48 which carries a series of vacuum cups 49 and 49a. Cups 49a are alternate to cups 49, cups 49 being connected through one air line system to pump 50 and cups 49a being connected through another air line system to pump 50a. Thus if one of the suction cups of one system should make contact with a rough spot on the molded sheet and the vacuum in this system be not effective for holding the sheet, the other system, having alternate cups should pick up and hold the sheet.

The board 48 has the slotted brackets 51 and the slots of these brackets engage bolts 52 on the cross carriage members 38. The cylinders 53, also mounted on cross carriage members, have their pistons attached to board 48 so that as the pistons of cylinders 53 are extended the board is lowered and as these pistons are raised the board 48, together with the molded sheet held by the cups, is also raised.

The connections to the air cylinders and the switches for the automatic control of the movements of this machine are schematically illustrated in FIG. 10. The operating sequence of the mechanism G will be explained as we follow the diagram given in FIG. 10.

Referring to cylinder C, it will be noted that on FIG. 10 its piston 29 is near the left hand end, which is the forward end of the cylinder.

A limit switch, LS6, is mounted on the press in such a manner that this switch is tripped when the upper jaw is raised as the press moves to open position. LS6 connects with the three way valve 60 and operates to open an air pressure line to the forward end of cylinder C behind the piston 29 (See air lines marked 61 and 62 in FIG. 10). This moves piston 29 rearwardly in the cylinder with the air in front of the piston escaping through the bleeder port 31. This pulls cable 30 about pulley 28 and serves to move carriage D forwardly. The carriage rollers 36 roll in the guide channels 21 and the front portion of the carriage enters the press. As the carriage moves further the rolls 36 enter the guide channels 22 inside the press and the carriage moves on to its fully extended position as the piston 29 approaches the rearward end of the cylinder C. During the forward travel of the carriage switch LS10 is closed so as to set up a circuit for operation of the grasping mechanism E when this circuit is otherwise made.

When piston 29 approaches the end of the long cylinder C to complete its travel the carriage will have been pulled to the place it operates the switches LS4 and LS11. Switch LS4 operates to close the 3-way valve 60 thus shutting off the supply of air to the cylinder C. Switch LS11 completes the circuit to the sheet grasping mechanism E which operates the solenoid valve 55 and sends air into the cylinders 43.

At this time the carriage has advanced to a position in which the lip 41 of mechanism E is under the edge of the next sheet to be pulled into the press. The actuation of cylinders 43 serves to press the needles 44a through the impregnated fabric or glass mat being used, and the needles come to rest behind the strip 47.

Simultaneous with the actuation of the grasping mechanism to grasp the next raw material sheet, a spool valve 56 is operated, allowing air to enter the diaphragm of the 4-way timer valve 57 causing this valve to operate and pass air into the cylinders 53 of the pickup mechanism F. This operates to move the cup-board 48 downwardly to bring the vacuum cups 49 and 49a into contact with the surface of the last panel to be formed by the press. The vacuum pumps are normally in operation and when the cups contact the panel they attach themselves to it. A bleeder valve in the diaphragm of the 4-way valve 57 controls the time delay, allowing the vacuum cups to grasp. When the bleeder valve has bled the contained air to the atmosphere the 4-way valve reverses the air to the cylinders 53 which operates to return the cup boards 48 to their upper position with the molded sheet attached.

Switches LS7 and LS8 are mounted on the cup boards 48 and when the molded panel has been raised it contacts these switches. This serves to operate the 3-way valve 60 to pass air to the rearward end of cylinder C back of piston 29 to thus start the piston 29 on its forward stroke and to start the carriage on its rearward stroke. By having the two spaced switches LS7 and LS8, the circuit is not actuated unless the sheet or panel being removed is flat beneath the carriage and securely held. The carriage will not be moved if one end only is engaged or the molded sheet is not held properly. This is important because it is possible that one or more of the cups will strike surface spots which prevent the vacuum from holding. Also the feature of having alternate cups draw their vacuum from different sources is desirable in that it takes a failure of at least one cup in each vacuum system to prevent effective operation.

As the piston 29 of cylinder C moves forwardly within the cylinder the carriage begins its rearward movement and switches LS4 and LS11 are moved to their starting positions. When the carriage has moved to the point where the raw impregnated sheet is brought to its proper position in the press (See FIG. 9), the carriage trips switch LS10 which deenergizes the 4-way valve 60, to reverse the air in the cylinders 43. Retraction of the pistons of cylinders 43 releases the sheet from the grasp of mechanism E to drop the sheet in this position while allowing the carriage to continue its rearward movement. The raw uncured sheet then lies in its proper position on the press platen ready to be molded and cured upon the closing of the press.

Upon further reverse travel of the carriage it contacts and operates switch LS9 which closes a circuit to operate a horn 64 for a timed period to warn all personnel that the cycle is about to be completed and that the press will be closing.

As the carriage approaches the end of its rearward movement it contacts and trips switch LS5 which closes the 3-way valve 60 (its normal position) which shuts off the air to the cylinder C and stops the carriage.

When the carriage reaches its rearward position it contacts a dump valve 65 which cuts off the vacuum to cups 49 and 49a allowing the molded sheet to fall to the floor underneath the machine where it stacks on top of the panels which have been made in previous cycles.

The press then closes to mold and cure the resin-impregnated sheet, and when it again opens the cycle repeats itself.

In the drawings the air connections between the valves and the cylinders they operate are not shown because this would create confusion in the interpretation of the drawings, and further, it is within the skill of this art to make these connections by suitable tubing and electrical wires. The necessary valves and switches are also of types commonly known to this art and detailed drawings or descriptions of the interior structures of these devices is not necessary.

It is a distinct advantage that the carriage is propelled by the cylinder C and it has not hitherto been known that a carriage with such a long travel could be propelled by cylinder and piston means.

In my invention the cylinder yields many advantages in that the action is rapid and the movement is quick from one function to another. Further the speed of the carriage may be adjusted and regulated by making a greater or lesser opening at the bleeding ports 31 and 32. The air being introduced into the cylinder is at a more or less constant pressure and the speed of movement of piston 29 is principally regulated by the speed at which the air on the other side of the piston can escape from the cylinder. By opening the bleeder ports 31 on the rear end of the cylinder to a greater extent than the bleeder port 32 at the forward end, the rearward stroke of the piston (and the forward stroke of the carriage) can be made faster than the stroke in the opposite direction. This means that the carriage may be moved forwardly very rapidly into the press during which time it has no functions to perform, and may be retracted under load at a more modest speed, all without any change in the air pressure applied.

It is a further advantage to use the cable 30 in translating the movements of the piston 29 to movements of the carriage. This gives facility in that the cable pulls the carriage in one or another direction, eliminating the almost inevitable buckling which would take place if the usual piston rod were to be employed.

It is an advantage also to have an improved mechanism E for grasping the edge portion of the impregnated sheet which is to be pulled into the press. Here the lip of the grasping mechanism moves to a position under the edge of the sheet, and the needles, powered by the air cylinders are passed through the sheet and anchored under the strip which goes across the very tip of the lip. This makes a very positive engagement but at the same time one which is quickly and surely released when the air on the cylinders is reversed.

Although any type of fluid, gaseous or liquid, may be used for operating the cylinders of this machine, I prefer to use air because it operates very rapidly to perform the functions intended and also it permits being discharged to the atmosphere without leaving any residue.

It will be understood that although a particular embodiment of the invention has been described in detail herein, many other embodiments may be provided and many changes and alterations may be made in line with the spirit of this disclosure and the skil of the art, without departing from the invention.

I claim:

1. In apparatus for introducing a raw material sheet into a press, a carriage extendable into said press and retractable therefrom, a lip carried by said carriage and extendable under an edge portion of said sheet, said lip having a strip extending transversely thereof, a plurality of spaced needles carried by said carriage, and means for driving said needles through an edge portion of said sheet to a position behind said strip.

2. Apparatus as set forth in claim 1 wherein said means includes a plurality of cylinders carried by said carriage having pistons which when extended drive said needles.

3. Apparatus as set forth in claim 2 including switch means for connecting air pressure to said cylinders to extend said pistons when said carriage has moved to a predetermined position as it is extended into said press.

4. Apparatus as set forth in claim 1 wherein said strip is cylindrical in form.

5. In apparatus of the character set forth, a press having jaws which open to receive material between said jaws, a carriage which is movable between said jaws into and out of said press, a fluid cylinder having a piston therein, means connecting said piston with said carriage whereby movement of said piston in one direction in said cylinder produces movement of said carriage into said press between said jaws and movement of said piston in another direction in said cylinder produces movement of said carriage out of said press, first means for introducing fluid into said cylinder on one side of said piston to move said piston in one direction to extend said carriage between said jaws, second means for introducing fluid into said cylinder on the other side of said piston to move said piston in said other direction to withdraw said carriage, and means for stopping the flow of fluid produced by said first means when said carriage has advanced to a predetermined position, and means for starting the flow of liquid into said cylinder on said other side of said piston after a time delay period to withdraw said carriage from said press.

6. Apparatus as set forth in claim 5 including means on said carriage for grasping raw material sheets during said period of time delay.

7. Apparatus as set forth in claim 6 including means on said carriage for picking up finished sheets within said press during said period of time delay.

8. Apparatus as set forth in claim 7 including means for releasing said grasping means when said carriage has moved to a predetermined position where said raw material sheet is between the jaws of said press.

9. Apparatus as set forth in claim 8 including means for discharging said finished sheet from said carriage when said carriage has moved to a predetermined position beyond said position at which said releasing means is actuated.

10. Apparatus as set forth in claim 5 including means on said carriage for picking up finished sheets within said press during said period of time delay.

11. In apparatus of the character set forth, a press having jaws which open to receive material between said jaws, a carriage which is movable between said jaws into and out of said press, a fluid cylinder having a piston therein, means connecting said piston with said carriage whereby movement of said piston in one direction in said cylinder produces movement of said carriage into said press between said jaws and movement of said piston in another direction in said cylinder produces movement of said carriage in another direction out of said press, first means for introducing fluid into said cylinder on one side of said piston to move said piston in said one direction to extend said carriage into said press between said jaws, second means for introducing fluid into said cylinder on the other side of said piston to move said piston in said other direction to withdraw said carriage from said press, means on said carriage for picking up a finished sheet within said press after said carriage has been extended into said press, and means for starting the operation of said second means after the operation of said pickup means.

12. Apparatus as set forth in claim 11 wherein said pick up means includes cylinder means for raising said sheet from its position within said press prior to the removal of the sheet from the press.

13. Apparatus as set forth in claim 11 including means for discharging said finished sheet from said carriage when said carriage is moved to a predetermined position out of said press.

14. Apparatus as set forth in claim 11 including means for actuating said first means when the jaws of said press have been opened to a predetermined position.

15. Apparatus as set forth in claim 11 including means for starting the jaws of said press to close when said carriage has withdrawn to a predetermined position.

16. Apparatus as set forth in claim 15 including means for producing a signal as said carriage is withdrawn and before it reaches said predetermined position.

17. Apparatus as set forth in claim 11 wherein said pick up means includes a plurality of vacuum cups adapted to engage the finished sheet.

18. Apparatus as set forth in claim 17 wherein said discharge means includes mechanism for cutting off vacuum to said cups.

19. Apparatus as set forth in claim 11 wherein said pick up means includes a cylinder and a piston, said piston being arranged to move downwardly toward said finished sheet when extended, means for attaching the downward end of said piston to said sheet whereby to raise said sheet when said piston is retracted, and means for retracting said piston to elevate said sheet after said sheet has been picked up and before said period has expired.

20. Apparatus as set forth in claim 19 including switch means operable when said sheet has been elevated to a predetermined position for starting flow of fluid to said other side of said first mentioned piston to start said carriage to move in said other direction out of said press.

21. Apparatus as set forth in claim 20 in which said switch means is operable to contact with said finished sheet.

22. Apparatus as set forth in claim 19 including time delay means for actuating said retracting means after a period following downward movement of said piston.

23. Apparatus as set forth in claim 11 including means on said carriage for grasping a sheet to be fed to the press, and means for releasing said grasping means after said carriage has been withdrawn with said sheet in tow to a predetermined position, said starting means being operable after the operation of both said releasing means and said pickup means.

24. Apparatus as set forth in claim 23 including means for releasing said pickup means to drop said finished sheet when said carriage has been withdrawn to a predetermined position beyond said predetermined position.

25. In apparatus of the character set forth, a press having jaws which open to receive material between said jaws, a carriage which is movable between said jaws into and out of said press, a fluid cylinder having a piston therein, means connecting said piston with said carriage whereby movement of said piston in one direction in said cylinder produces movement of said carriage into said press between said jaws and movement of said piston in another direction in said cylinder produces movement of said carriage in another direction out of said press, first means for introducing fluid into said cylinder on one side of said piston to move said piston in said one direction to extend said carriage into said press between said jaws, second means for introducing fluid into said cylinder on the other side of said piston to move said piston in said other direction to withdraw said carriage from said press, means on said carriage for grasping an edge of a sheet to be fed to the press, means for starting the operation of said second means after the operation of said grasping means, and means operable when said carriage has moved with said sheet in tow to a predetermined position for releasing said grasping means to drop said sheet.

26. Apparatus as set forth in claim 25 in which said grasping means includes a fluid cylinder and in which said releasing means actuates said cylinder to release said grasping means.

27. Material handling apparatus for a press comprising a frame, a carriage carried by said frame and reciprocally movable therein, said carriage having a material engaging mechanism on its forward portion and being extensible to bring said forward portion into the open jaws of said press and retractable to remove said portion from the jaws of said press, said material engaging device including a lip arranged to extend on one side of sheet material to be fed to the press and including also needles arranged for movement through said sheet material and toward said lip, a fluid cylinder fixedly mounted in said frame and having a piston therein, and means for connecting said piston to said carriage to extend said carriage forwardly into said press when said piston is moved rearwardly within said cylinder and to retract said carriage rearwardly when said piston is moved forwardly within said cylinder.

* * * * *